(12) United States Patent
Catanese et al.

(10) Patent No.: US 9,009,595 B2
(45) Date of Patent: Apr. 14, 2015

(54) USER MANIPULATION OF VIDEO FEED TO COMPUTER SCREEN REGIONS

(76) Inventors: Joseph P. Catanese, Stratford, CT (US); Paul Delano, Norwalk, CT (US)

( * ) Notice: Subject to any disclaimer, the term of this patent is extended or adjusted under 35 U.S.C. 154(b) by 777 days.

(21) Appl. No.: 12/927,711

(22) Filed: Nov. 22, 2010

(65) Prior Publication Data

US 2011/0072349 A1 Mar. 24, 2011

Related U.S. Application Data

(63) Continuation-in-part of application No. 10/861,237, filed on Jun. 4, 2004, now Pat. No. 7,844,900, and a continuation-in-part of application No. 10/357,565, filed on Feb. 5, 2003, now abandoned.

(51) Int. Cl.
| | |
|---|---|
| G06F 3/00 | (2006.01) |
| H04N 5/445 | (2011.01) |
| H04N 5/45 | (2011.01) |
| H04N 21/431 | (2011.01) |

(52) U.S. Cl.
CPC ........... *H04N 5/445* (2013.01); *H04N 5/44591* (2013.01); *H04N 5/45* (2013.01); *H04N 21/4316* (2013.01); *Y10S 715/974* (2013.01)

(58) Field of Classification Search
USPC ........................................................ 715/974
See application file for complete search history.

(56) References Cited

U.S. PATENT DOCUMENTS

| | | | |
|---|---|---|---|
| 4,829,294 A * | 5/1989 | Iwami et al. ................. | 715/803 |
| 5,305,099 A * | 4/1994 | Morcos .......................... | 348/88 |
| 5,390,501 A | 2/1995 | Davis | |
| 5,712,995 A | 1/1998 | Cohn | |
| 5,714,972 A * | 2/1998 | Tanaka et al. ................. | 345/156 |
| D400,195 S | 10/1998 | Utesch | |
| 5,841,435 A | 11/1998 | Dauerer | |
| D403,674 S | 1/1999 | Arora | |
| D403,675 S | 1/1999 | Meade | |
| D404,390 S | 1/1999 | Ozawa | |
| 5,900,916 A * | 5/1999 | Pauley ............................ | 725/59 |
| 6,144,362 A * | 11/2000 | Kawai .......................... | 345/629 |
| 6,204,887 B1 * | 3/2001 | Hiroi ............................. | 348/565 |
| 6,219,679 B1 * | 4/2001 | Brisebois et al. ............. | 715/206 |
| 6,373,500 B1 * | 4/2002 | Daniels ......................... | 345/632 |
| 6,563,547 B1 * | 5/2003 | Smith ........................... | 348/565 |
| 6,639,606 B1 * | 10/2003 | Choi ............................. | 715/700 |
| 7,010,755 B2 * | 3/2006 | Anderson et al. ............. | 715/778 |
| 7,136,042 B2 * | 11/2006 | Magendanz et al. .......... | 345/100 |
| 7,168,048 B1 * | 1/2007 | Goossen et al. .............. | 715/797 |
| 7,320,112 B2 * | 1/2008 | Yamaguchi et al. .......... | 715/831 |
| 7,352,952 B2 * | 4/2008 | Herberger et al. ............ | 386/282 |

(Continued)

*Primary Examiner* — Ryan Pitaro
(74) *Attorney, Agent, or Firm* — Alfred M. Walker; John F. Vodopia

(57) ABSTRACT

A process for dividing an electronic screen, such as a television or computer screen, into discrete, independently operating sub-screens includes the step of electronically linking the screen to a screen operating system. This operating system is capable of selectively dividing the screen into two or more sub-screens which support audio or visual data in an active mode simultaneously and independently. This is performed through the use of a plurality of data access lines which provide data simultaneously to the two or more sub-screens such that the data can be simultaneously accessed and manipulated in more than one sub-screen such that each sub-screen actively supports data generated from a dedicated software program. Such invention may be implemented in customized encoded hardware or a combination of hardware and software.

27 Claims, 7 Drawing Sheets

(56) References Cited

U.S. PATENT DOCUMENTS

| | | |
|---|---|---|
| 2002/0171682 A1* | 11/2002 | Frank et al. .................. 345/790 |
| 2002/0191028 A1 | 12/2002 | Senechalle |
| 2003/0105719 A1 | 6/2003 | Berger |
| 2003/0190940 A1 | 10/2003 | Gordon |
| 2004/0070608 A1* | 4/2004 | Saka ............................ 345/748 |
| 2005/0060759 A1 | 3/2005 | Rowe |
| 2005/0257128 A1* | 11/2005 | Pasquali et al. ............... 715/500 |
| 2008/0141132 A1* | 6/2008 | Tsai .............................. 715/716 |
| 2008/0301560 A1* | 12/2008 | Rogers et al. ................. 715/724 |
| 2012/0206562 A1* | 8/2012 | Yang et al. ................. 348/14.09 |

* cited by examiner

USER MANIPULATION OF VIDEO FEED TO COMPUTER SCREEN REGIONS

CLAIM OF PRIORITY FROM RELATED APPLICATIONS

This patent application claims priority under 35 U.S.C. §120 from non-provisional patent application, Ser. No. 10/357,565 with a filing date of Feb. 5, 2003. This application is a continuation in part of the Ser. No. 10/357,565 non-provisional application, and which application is incorporated by reference herein. This patent application also claims priority under 35 U.S.C. §120 from non-provisional patent application, Ser. No. 10/861,237 with a filing date of Jun. 4, 2004, which application was published as USPTO Publication Number 2005/0007501 A1 of Jan. 13, 2005, and which application is incorporated by reference herein. This application is a continuation in part of the Ser. Nos. 10/357,565 and 10/861,237 non-provisional applications.

FIELD OF THE INVENTION

The present invention relates to manipulation of computer screen regions, wherein the data in each sub-screen can be simultaneously accessed and manipulated through the screen operating system.

BACKGROUND OF THE INVENTION

The present invention generally relates to electronic screens, such as those used in television sets and computer monitors. More particularly, the present invention resides in a process for dividing such electronic screens into discrete, independently operating sub-screens which can be simultaneously manipulated and accessed.

In the past, electronic screens, such as those used for televisions and computers, have only supported a single active window or screen at a time. For example, even televisions with picture-in-picture capabilities have only one active screen which can be manipulated at any given time. Similarly, in computer monitor systems, although the computer monitor screen may show a plurality of windows at any given time, only one window is active. There are instances when the computer screen can be divided into two screens, but the contents of the two windows are controlled by the same software, for example, a word processing function allowing two separate windows to be created to view two documents. However, only one of the documents can be accessed and manipulated at any given time, even in this scenario.

US Publication number 20020191028 of Senechalle discloses a window manager user interface for creating and managing a variety of split screen configurations in which the applicants of this reference refer to a frame window and pane windows. The user is able resize the various windows, reposition the windows, and generally manipulate them in a variety of manners on the video screen. The windows do not interfere with each other [0026]. Presumably separate programs are operating in each of the windows but the "user can generally only work in one pane window 14 at a time" [0055]. The user can select the program for any particular window [0060]. In addition, a user can have a single application or "different applications in one or more pane windows" [0062]. Other than the foregoing, the reference is virtually and exclusively concerned with window size, shape, arrangement and similar features of the various windows on the display screen.

The present invention, in addition to providing multiple windows on a single display screen, allows an interaction between the content of different screens such as the user selecting a "portion of the of the primary display to be presented in another display" [0030], something specifically not taught or suggested in Senechalle, and an arrangement for facilitating "seamlessly and easily interact and manipulate applications across various hardware, and visual presentation configurations" [0029]. also not taught or suggested in the Senechalle reference.

U.S. Pat. No. 7,010,755 to Anderson for a Virtual Desktop Manager teaches a method for a user to preview multiple virtual desktops in a graphical user interface. Displaying, tiling, cascading, and other user-controllable processes for managing a multi-faceted display are provided. However, the signals to be displayed are merely resized, opened, closed, cascaded, tiled, maximized, minimized and so forth. In other words, the invention of Anderson comprises now classical conventional manipulation. But what the present invention teaches, and Anderson does not is the actual manipulation of conventionally generated display signal from a conventional source such as a program application and moreover, the actual manipulation is accomplished by the present invention's provision of a user controlled screen operating system. Anderson '755 does not provide such a user-controlled screen operating system, nor do any of the following patents.

U.S. Pat. No. 6,563,547 to Smith discloses a System and Method for Displaying a Television Picture Within Another Displayed Image. Smith '547 teaches a picture-in-picture television display where the two displayed images may be moved around and resized relative to each other, but the viewer cannot controllably modify or customize the dynamic display, as is provided for in the present invention. Nowhere does Smith '547 teach that the viewer can controllably zoom or shrink the television picture so as to be able to see just a portion of the TV picture desired—but the present invention does so, which is the conceptual step forward of the present invention, and the present invention does so by means of the uniquely provided screen operating system that Smith '547 fails to provide.

Additionally, U.S. Pat. No. 5,841,435 to Dauerer for a Virtual Windows Desktop discloses a process for a virtual windows desktop system. It, like Smith '547 and Anderson '755, provides for conventional computer desktop grouping, hiding, and redisplaying of groups of application windows or icons. But Dauerer '435 is silent on user modification of a plurality of data streams by means of a dedicated screen operating system as the present invention provides.

Turning to Standard English dictionary definitions of the generic term "manipulate" in combination with human-computer interaction, Wikipedia furnished the following definition of "direct manipulation" on a computer screen, on 16 Apr. 2007):

Direct manipulation interface

Direct manipulation is a human-computer interaction style that was defined by Ben Schneiderman and which involves continuous representation of objects of interest, and rapid, reversible, incremental actions and feedback. The intention is to allow a user to directly manipulate objects presented to them, using actions that correspond at least loosely to the physical world. Having real-world metaphors for objects and actions can make it easier for a user to learn and use an interface (some might say that the interface is more natural or intuitive), and rapid, incremental feedback allows a user to make fewer errors and complete tasks in less time, because they can see the results of an action before completing the action. An example of direct-manipulation is resizing a graphical shape, such as a rectangle, by dragging its corners or edges with a mouse.

Individuals in academia and Computer scientists doing research on future user interfaces often put as much or even more stress on tactile control and feedback or sonic control and feedback than on the visual feedback given by most GUIs. In these cases the term "graphical user interface" seems inadequate. As a result the term direct manipulation interface has been more widespread in these environments.

While all of the above-cited generic material relating to computer manipulation is generally applicable of the invention, the Wikipedia definition of the term "direct manipulation" combined with "computer graphics" is also important to consider in the context of the invention.

Wikipedia.org furnished the following definition of Direct manipulation in computer graphics on 16 Apr. 2007):

Direct manipulation in computer graphics

Because of the difficulty of visualizing and manipulating various aspects of computer graphics, including geometry creation and editing, animation, layout of objects and cameras, light placement, and other effects, direct manipulation is an extremely important part of 3D computer graphics. There are standard direct manipulation widgets as well as many unique widgets that are developed either as a better solution to an old problem or as a solution for a new and/or unique problem. The widgets attempt to allow the user to modify an object in any possible direction while also providing easy guides or constraints to allow the user to easily modify an object in the most common directions, while also attempting to be as intuitive as to the function of the widget as possible. The three most ubiquitous transformation widgets are mostly standardized and are:

the Translation widget, which usually consists of three arrows aligned with the orthogonal axes centered on the object to be translated. Dragging the center of the widget translates the object directly underneath the mouse pointer in the plane parallel to the camera plane, while dragging any of the three arrows translates the object along the appropriate axis. The axes may be aligned with the world-space axes, the object-space axes, or some other space.

the Rotation widget, which usually consists of three circles aligned with the three orthogonal axes, and one circle aligned with the camera plane. Dragging any of the circles rotates the object around the appropriate axis, while dragging elsewhere will freely rotate the object (virtual trackball rotation).

the scale widget, which usually consists of three short lines aligned with the orthogonal axes terminating in boxes, and one box in the center of the widget. Dragging any of the three axis-aligned boxes effects a nonuniform scale along solely that axis, while dragging the center box effects a uniform scale on all three axes at once.

Depending on the specific common uses of an object, different kinds of widgets may be used. For example, a light in computer graphics is, like any other object, also defined by a transformation (translation and rotation), but it is sometimes positioned and directed simply with its endpoint positions because it may be more intuitive to define the position of the light source and then define the light's target, rather than rotating it around the coordinate axes in order to point it at a known position.

Other widgets may be unique for a particular tool, such as edge control to change the cone of a spotlight, points and handles to define the position and tangent vector for a spline control point, circles of variable size to define a blur filter width or paintbrush size, IK targets for hands and feet, or color wheels and swatches for quickly choosing colors. Complex widgets may even incorporate some techniques from scientific visualization to efficiently present relevant data (such as vector fields for particle effects or false color images to display vertex maps).

Direct manipulation, as well as user interface design in general, for 3D computer graphics tasks, is still an active area of invention and innovation, as the process of generating CG images is generally not considered to be intuitive or easy in comparison to the difficulty of what the user wants to do, especially for complex tasks. The user interface for word processing, for example, is easy to learn for new users and is sufficient for most word processing tasks, so it is a mostly solved and standardized UI, while the user interfaces for 3D computer graphics are usually either difficult to learn and use and not sufficiently powerful for complex tasks, or sufficiently powerful but extremely difficult to learn and use, so direct manipulation and user interfaces will vary wildly from application to application.

References

Frohlich, David M, "*The history and future of direct manipulation,*" Behavior & Information Technology 12. 6 (1993), 315-329.

Hutchins, Edwin L., James D. Hollan, and Donald Norman. *Direct manipulation interfaces.* (1985)

Schneiderman, Ben. *Designing the user interface: strategies for effective human-computer-interaction.* (2004)

Schneiderman, Ben. "*Direct manipulation: a step beyond programming languages,*" IEEE Computer 16(8) (August 1983), 57-69.

See wikipedia.org for "Direct manipulation interface" on 16 Apr. 2007)

Accordingly, there is a need for a screen operating system which divides an electronic screen into discrete, independently operating sub-screens which are independently fed data and can be manipulated through discrete access lines. The present invention fulfills these needs and provides other related advantages.

SUMMARY OF THE INVENTION

The present invention resides in a process for dividing an electronic screen into discrete, independently operating sub-screens and as such provides split-screen technology where the additional screen sub-screens do not override the content of the other locations or sub-screens depending on user preference. This is performed by providing an electronic screen, such as a computer or television screen. In one embodiment, the screen is at least a twenty inch screen.

The screen is electronically linked to a screen operating system capable of selectively dividing the screen into two or more sub-screens with support visual and/or audio data therein in an active mode simultaneously and independently. This is done by creating a plurality of data access lines which provide data simultaneously to the two or more sub-screens. The data in the more than one sub-screen can be simultaneously accessed and manipulated through the screen operating system. Thus, each sub-screen actively supports data generated from a dedicated software program. Of course, it will be appreciated by those skilled in the art that the data can comprise visual or audio data.

The present invention also concerns computer data manipulation.

For example, the invention takes the signal feed from a conventional source of any kind [e.g., without limitation, graphical display generated by a conventional computer application, graphic display from a communication device, audio-visual display, and so forth] and allows the user to manipulate that signal fed through one among a plurality of data lines. By "user", it is noted to be not just a consumer end use viewer of electronic media, but also the creator of the media, such as the "Discovery Channel®", but also a media distributor such as a national television network, a cable television entity or an Internet based media provider, such as America Online®, You Tube® or individual media creators posting their own website or Internet blog, which is ultimately viewed by a "consumer end-user," such as a person viewing a computer screen, television or other personal electronic media.

The data so manipulated is much more than a mere management of desktop real estate, as is essentially the case with the above noted prior art patents. In fact, the data manipulation allows the user to abstract, convert and manipulate the signal moving through and being processed by the screen operating system so as to display the result of the manipulation selectively and differently from the prior art visual result of merely passing the signal through to the electronic screen.

Thus, for example, in the invention, where a conventional graphical feed has been generated, for example, by an internet website coming from a user's financial institution, the user might be interested in his/her bank balance and further interested in ignoring the typical screen-clutter.

Under the invention the graphical feed would not be fed directly from conventional graphics-generating software that is typically conventionally found in an on-board graphics card. Instead, the graphic signal for displaying the financial institution website would be fed not to the electronic screen but rather to the screen operating system (SOS) of the invention. This screen operating system is described in the co-pending application filed as Ser. No. 10/861,237 of Jun. 4, 2004, as published as USPTO Publication Number US 2005/0007501 A1, wherein it is referred to generally as a "screen operating system" at paragraph 0019, line 3 thereof and in paragraph 0023 at lines 6 through 12. The Screen Operating System (SOS) is also based upon what is referred to as the "Video Operating System (VOS), described in paragraphs 0025 through 0049 therein, and as shown in drawing FIGS. 1 through 8 therein.

It is the function of the screen operating system (SOS) to (a) provide the user with tools to manipulate the through-flowing data stream so as to modify how it is displayed. Under the invention, any desired portion of the conventional video display may be user re-sized or hidden.

Using the example of the financial institution website, the user could thus modify the screen displaying the bank balance to show only the bank balance or to show the bank balance with as much of the surrounding website screen as desired; in addition, the user may selectively re-size the bank balance portion of the feed so as to emphasize it visually and then, using one of the plurality of data lines, generate a new discrete bank-balance window [or sub-screen, to use an alternate term for the same thing].

The new bank-balance window can be positioned, resized, overlaid with other graphics, hidden for user at-will recall and so forth as is done in the prior art patents cited against the currently pending application.

However, what none of the prior art teaches is the manipulation of data streams so as to modify the display of respective data streams by using a separate intermediary screen operating system. The invention does just that.

The invention may have, but does not require at least two sub-screens. Instead the invention may feature multiple simultaneous video displays (i.e. "regions") within a single window, meaning that the single window is displaying multiple simultaneous user manipulable active [i.e., dynamic] displays. By using the screen operating system, the user can modify the content of any part of any one or all of the respective displays, even though they are physically manifested on a single screen in what appears to be a single window.

In fact that single window is actually split into a user-controlled number of windows, where each "window" [may be called a sub-screen] is actually occupying a portion of the display real estate of what otherwise may appear to a viewer as a single windows. For example, a dynamically changing weather report could be in a user-controlled upper-right portion of the screen; a stock-ticker could occupy a position just below the weather report in the upper-right. A display of analog clocks could display time-of-day in any user-selected time zone and the clocks could be displayed in a user-controlled upper-left portion of the screen; a conventional TV-broadcast situation comedy could occupy a user controlled lower-left portion of the screen; a dynamic display of a news broadcast could occupy a position slightly above the situation comedy display; a software application could occupy a user-controlled medial position on the screen, as could a sports-broadcast display and a set of user-selected up-to-the-minute set of sports scores from a user-determined assembly of dynamic sports score data;

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
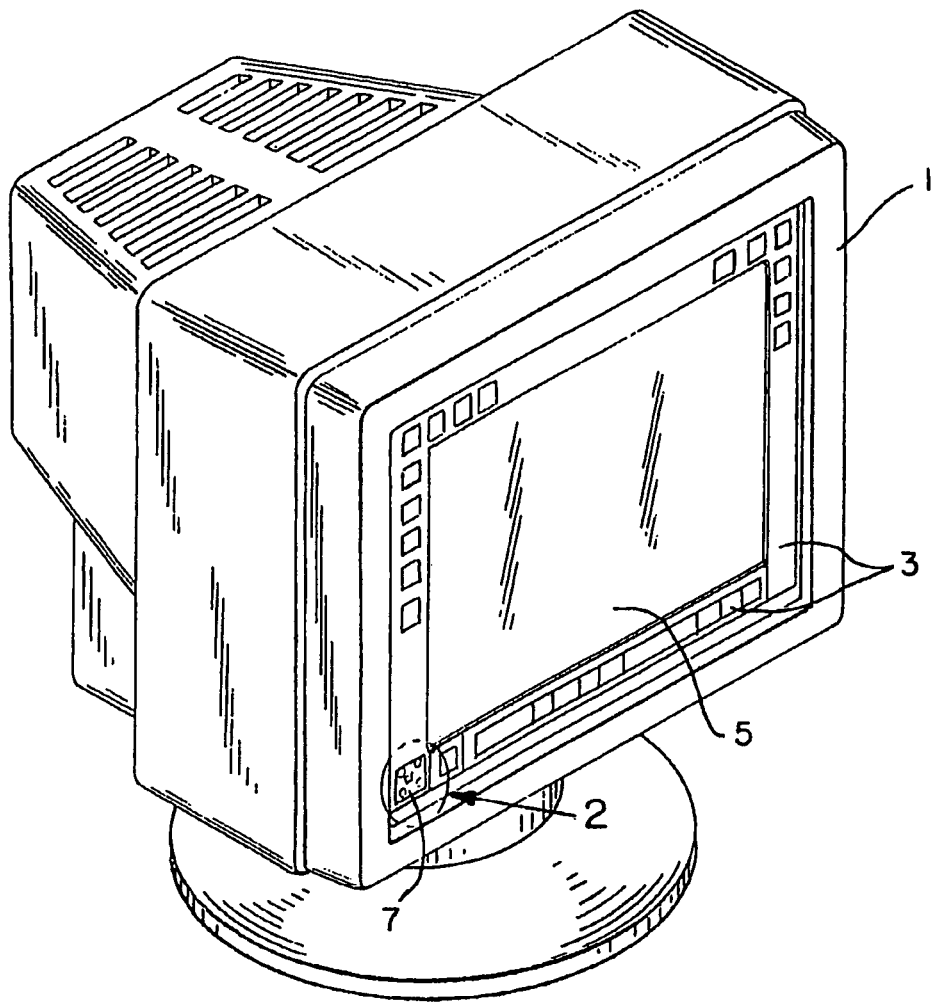
FIG. 1 is a diagrammatic view of an electronic screen divided into multiple operating sub-screens in accordance with the present inventions.

As illustrated in FIG. 1, the present invention resides in an electronic screen 1, such as a computer screen, television screen, or any other electronic screen. In one embodiment, the electronic screen 1 is a television screen having a dimension of at least twenty inches. The screen 1 is electronically linked to a screen operating system which is capable of selectively dividing the screen 1 into two or more sub-screens 3 with support visual and/or audio data therein in an active mode simultaneously and independently.

This is done by creating a plurality of data access lines through which the data is transmitted to the two or more sub-screens 3. For example, illustrated sub-screen 5 comprises a main screen, such as the screen which would initially appear upon turning on the television. Using the screen operating system, and possibly key strokes or icon based commands, the screen operating system could be manipulated so as to provide a secondary screen illustrated as sub-screen 3, which could have other information, such as closed caption writing. Yet another sub-screen, such as that illustrated as sub-screen 3, could be made in order to support additional information, such as a ticker tape or financial market news. The main viewing screen 5 could be physically one screen, but electronically split into multiple screens such that the content of each screen does not permanently override the other unless the user so designates it. Preferably, the user can selectively enlarge or reduce the size of each screen 3.

Figure 2:
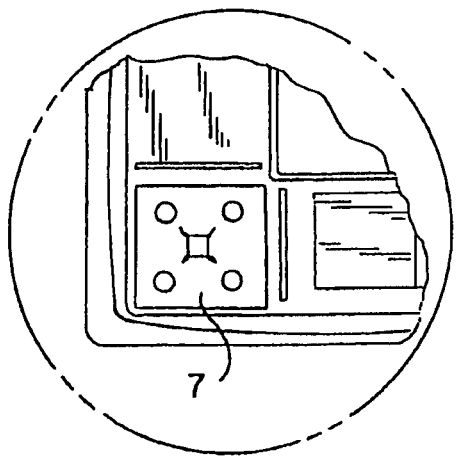
FIG. 2 is the blow up view of sub-screen with manipulability.

Also, in the particular embodiment, the data in each sub-screen can be simultaneously accessed and manipulated through the screen operating system. Thus, each sub-screen 3 actively supports data generated from a dedicated software program. In this regard, are active stock ticker tape symbol screen, such as that illustrated in screen 7, could be actively updated while the user viewed a television program or conducted data processing using a data processing software program as shown in FIG. 2.

Additional sub-screens do not override the content of the other sub-5 screens. The data that is placed within them, icons, pictures, excel file numbers, electronic TV guide, screen saver pictures, etc. is irrelevant just as the software used to write it whether it be Windows based, Linux based, or Mac based.

In fact, it is contemplated that the World Wide Web could be navigated while another sub-screen supports another function. For example, while writing a report, a word processing program could support an individual screen while the other sub-screen supported the navigation of the World Wide Web. Searches could be conducted in the World Wide Web screen while data would be manipulated in the other screen.

One of the sub-screens could be used to support a sound system, such as a home theater sound system using icons or the like, while viewing another screen or manipulating data in yet another screen. The sub-screens can be reconfigured so that they support different programs or have different data imported therein. As mentioned above, the user should be able to have the means to alter the size of the screen so that a particular sub-screen can be enlarged while others are reduced, yet still visible or operating.

The present invention will essentially define the convergence of a personal computer and television lending ease and functionality to Web TV and home integration networks. This also allows multi-tasking with a hierarchical structure depending on the user's visual usage importance in relation to the application relevance. Although the invention has been described in relation to a television screen, as its preferred embodiment, it should be understood that the teachings of the invention could be applied to virtually any digital screen which would be sub-divided into individual sub-screens using the screen operating system described herein. The larger the screen the more viewing possibilities become available to the user. Preferably, supplying a larger screen not only increases viewing area, but more importantly offers creative & interesting choices, i.e. totally diverse interacting scenarios arbitrarily chosen.

U.S. patent application Ser. No. 10/357,565 to Catanese, entitled "Process for Dividing an electronic Screen into Discrete, Independently Operating Sub-Screens", which is incorporated herein by reference.

Figure 3:
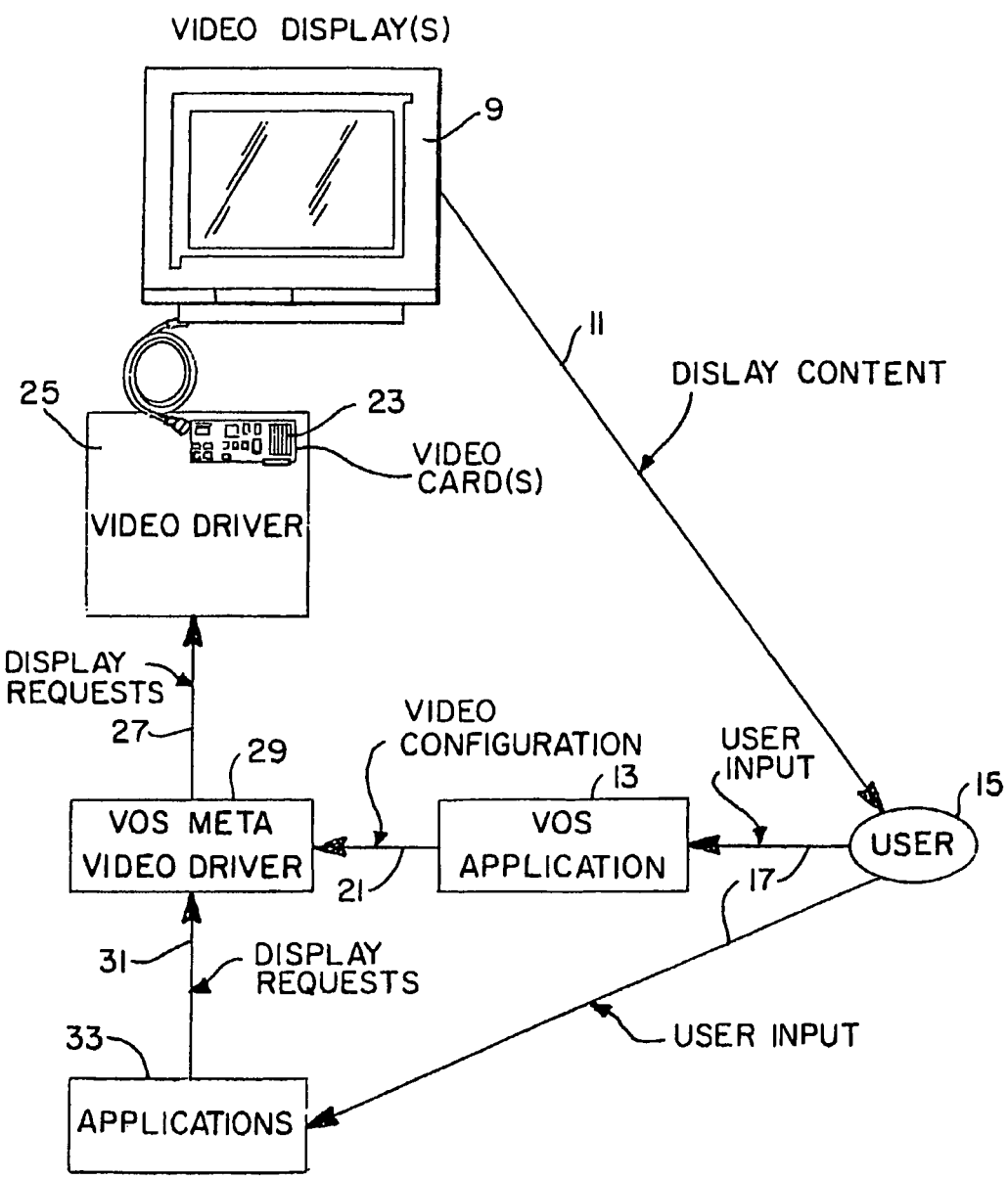
FIG. 3 is the flow diagram of the visual management system architecture.

As described in FIG. 3, the Video Display(s) component 9 is one or more video display device viewed by the user to interact with the video operating system (VOS)-enabled system. The output display 9 may take any form commonly known in the art such as, but not limited to: CRT monitors, plasma screens, organic light-emitting diodes, flexible computer displays such as e-paper, computer monitors, televisions, projection screens, and/or LCD screens. Individual sub-screens 3 may be allocated to certain video displays 9 by the user 15.

The Video Card(s) 23 component is one or more video driver hardware devices used to generate the video signal(s) for the Video Display(s). These are the hardware components of the VOS. The video card 23 utilized may also be any card commonly known in the art such as, but not limited to: Voodoo, Radeon, and GeForce.

The installation of this software can be, but not limited to: downloads via the internet, installation from media or wirelessly transferred.

The VOS Meta Video Driver 29 is a software component that accepts video Display Requests 27 from the applications 33 that want to display to the user. It takes the incoming Display Requests 27 and issues Display Requests 27 to the underlying Video Driver software 29 according to the Video Configuration 21. The Video Configuration 21 is modified by the User 15 via the VOS Configuration Application or by other means such as configuration files or other application interfaces. The VOS Meta Video Driver and the VOS Application are the software components of the VOS, however may be encoded into hardware form.

The software core component of the VOS is the Meta Video Driver 29. To applications it appears to be just another video driver, and to the underlying video drivers, it appears to be an application. In this way, the VOS Configuration Application can allow the user to seamlessly and easily interact and manipulate applications across various hardware and visual presentation configurations.

Capabilities of the VOS Configuration Application include the ability to take any video display request and reposition, rescale, adjust color, combine with other requests, etc. Additionally it has the capability to create it's own display requests and to interact with other applications. An example of this would be where a configurable icon bar is presented to the user in a VOS-controlled portion of the screen. This icon bar is used to control other applications within the primary video display. A more sophisticated implementation would allow the user to interactively select a portion of the primary display to be presented in another display. With this functionality, a user could select the news-ticker portion of a video feed from one window and display just that part of that video feed in another display.

The Applications 33 may display video inputs from various sources such as internal programs, external programs and external video sources. In this deployment, the VOS provides the capability to flexibly split and manage the available applications to provide the user with a multiple video source experience 3. Since the VOS system acts as a normal video driver for the applications, they do not need to be changed to take advantage of the advanced screen manipulation operations implemented by the VOS.

The VOS Configuration Application can also get its input from internal and external interfaces. This lets it manipulate the display according to user input from other applications, direct input from the user or from external controllers, limited only by the hardware and external software support.

The VOS may also be embodied primarily in hardware. This may be implemented by creating custom hardware components for the Video Display(s) 9 and/or the Video Card(s) 23.

In the Video Display(s) 9 custom hardware implementation, the image presented to the user 15 is be implemented by multiple video display units 9 that comprise a single visual experience to the user. For example the user may be presented with a primary video display unit (such as CRT or flat panel) with an additional smaller display unit alongside the primary one to display iconic or other information to the user.

In the Video Card(s) 23 custom hardware implementation, the VOS Meta Video Driver 29 and the Video Driver 25 components are merged. Additionally appropriate portions of the VOS Meta Video Driver 29 functionality are implemented inside the Video Card(s) 23. For example processing-intensive video operations such as scaling and screen division would be implemented by the hardware instead of the driver software, thus offloading the work from the host CPU onto the video hardware.

These Video Display(s) 9 and Video Card(s) 23 may be used together to create sophisticated visual configurations where a single Video Card 23 may be used to drive several display components together. For example, using the appropriate set of video cards and supporting hardware, a video wall of 9 flat-screen displays could be combined with a LED-array scrolling display to present an integrated visual experience to a large audience, all controlled by one VOS Application.

Figure 4:
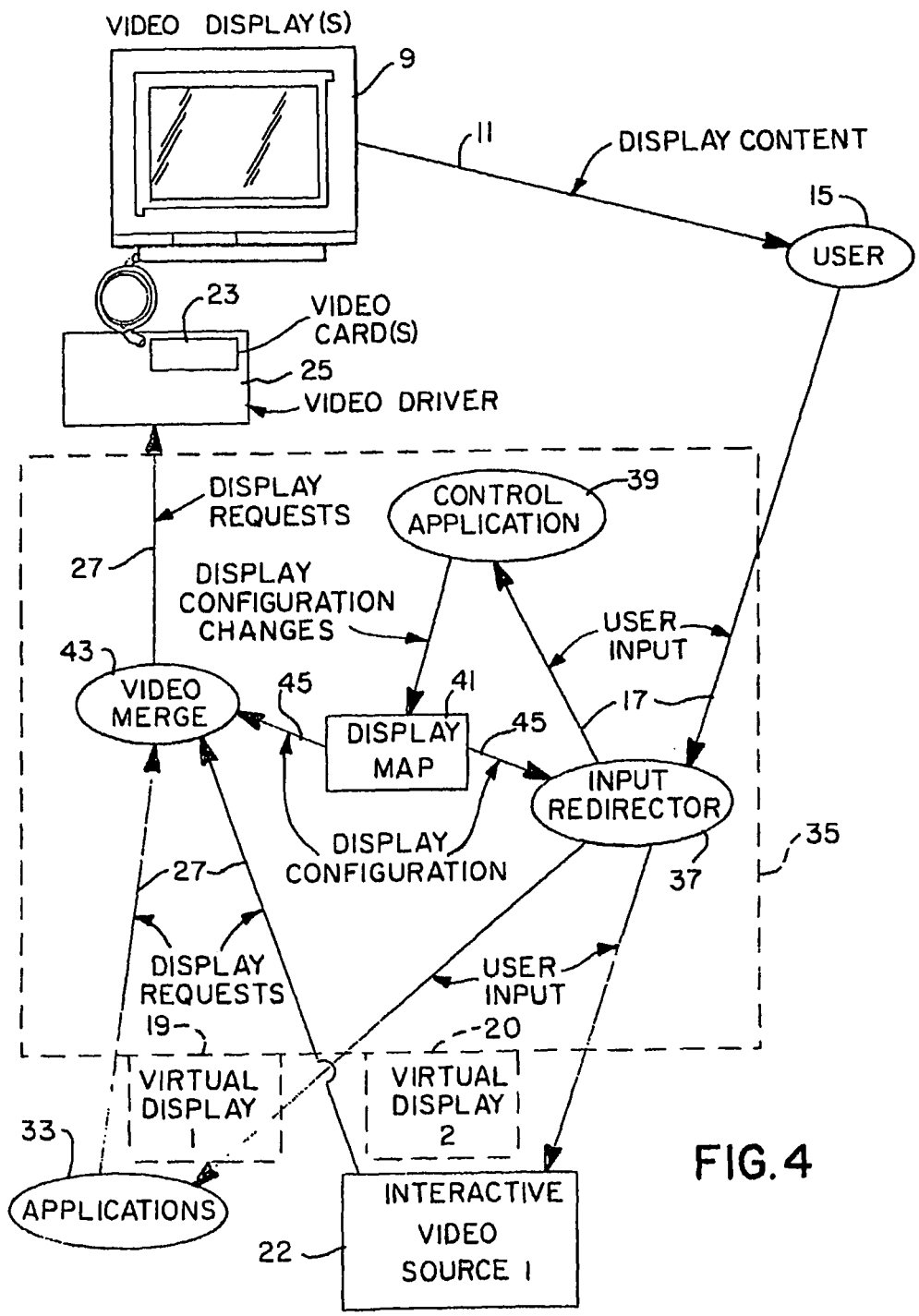
FIG. 4 is the flow diagram detailing the logical architecture.

As described in FIG. 4, the central part of the VMS architecture is the Display Map 41. The Display Map 41 is the internal representation of how video sources 22 are arranged on the video hardware. One or more Virtual Displays 19-20 are managed by the Control Application 39 inside the Display Map 41.

The Control Application 39 allows the user to manipulate the Display Map 41. It takes care of initializing the Display Map 41 at system startup, and saving it at system shutdown. It provides a user interface to the User 15 from which the user 15 can manage the display layout. It lets the user split displays and move and manipulate visual components and applications from one Virtual Display 19-20 to another.

Each application or Interactive Video Source 22 interacts with its own Virtual Display 19-20 which it considers to be its own. The Video Merge 43 uses the Display Map 41 to translate the Virtual Displays 19-20 into one set of operations sent to the video driver(s) 25. Likewise, the Input Redirector 37 takes User Input 17 and sends it to the appropriate Virtual Display 25 interface that each Application or Interactive Video Source 22 gets its input 17 from.

Figure 5:
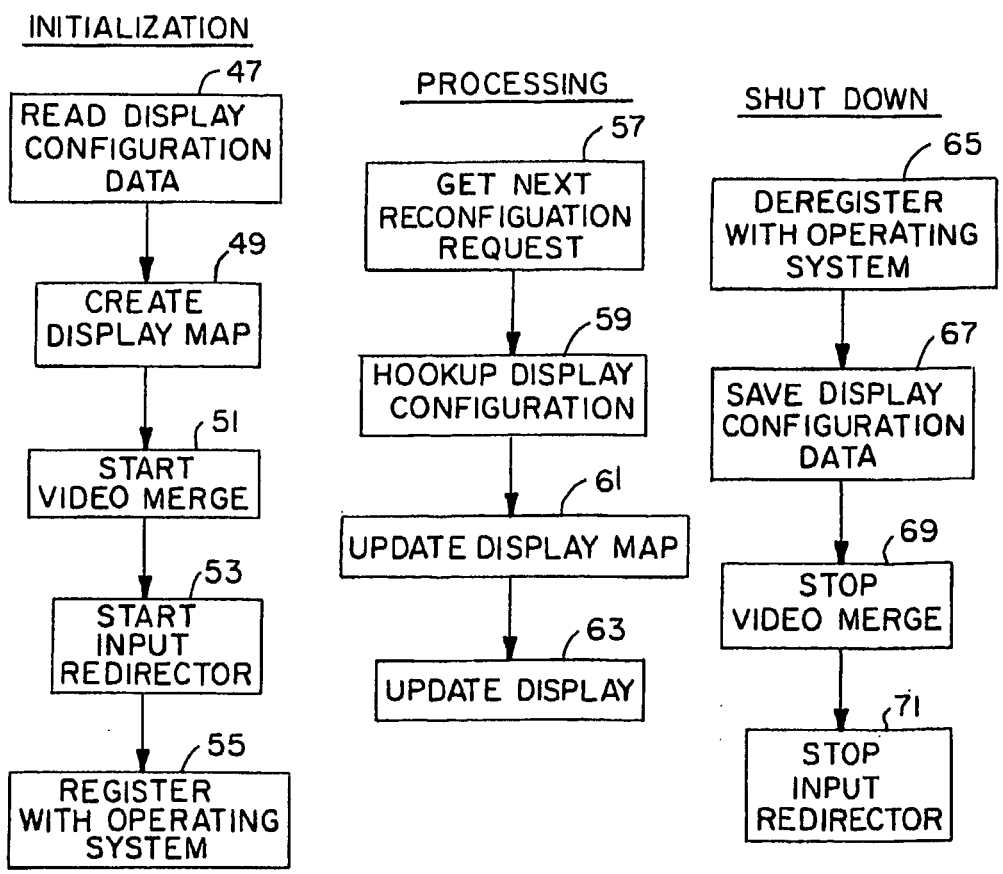
FIG. 5 is the flow diagram of the control application process.

As described in FIG. 5, the Control Application allows the user to manipulate the Display Map 44. It takes care of initializing the Display Map at system startup, and saving it at system shut down.

The Initialization process begins by reading display configuration data 47 from a file or other data source. It then creates the Display Map 49 internal data structures and starts the Video Merge 51 and Input Redirector services 53. Once internal initialization is complete, it registers with the Operating System 55 to let it know that it is ready to handle input and display requests.

Once initialized, the Control Application processes display reconfiguration requests 57 from user input 17. It does this by matching the request with the current state of the Display Map, and updating the Display Map 61 as necessary to fulfill the request. If the change to the Display Map requires a change in display 63, it updates the Video Merge process with the required changes.

At system shut down, the Control Application deregisters 65 itself from the operating system, saves the display configuration data 67 from the Display Map, and then shuts down the Video Merge 69 and Input Redirector processes 71.

Figure 6:
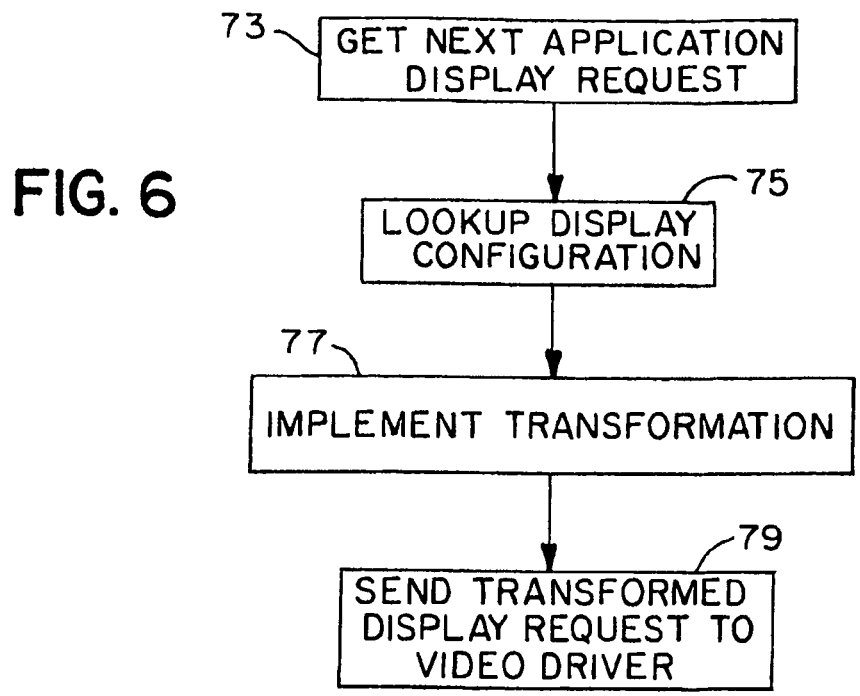
FIG. 6 is the flow diagram of the video merge process.

As described in FIG. 6, the Video Merge process takes the various Display Requests 73 from the Applications and Interactive Video Sources and translates them for display on the video hardware.

Its processing consists of first, getting each Display Request 73. It then looks up the context of the Application 75 in the Display Map to determine what transformations are required. It implements those transformations 77 on the original Display Request, which include operations such as resizing or clipping. The transformed Display Request 79 is then passed on to the Video Driver that actually displays the information. For example an application in Virtual Display A wants to display an image bounded by rectangle with X, Y coordinates of 50, 150 by 200, 250. That Virtual Display is positioned on the actual display at base coordinate with an offset of 55, 55 and a reduced scale of 50%. The transformed display result sent to the Video driver is a rectangular image composed from the original image reduced in size by 50% and bounded by coordinates of 80, 130 by 155, 180.

Figure 7:
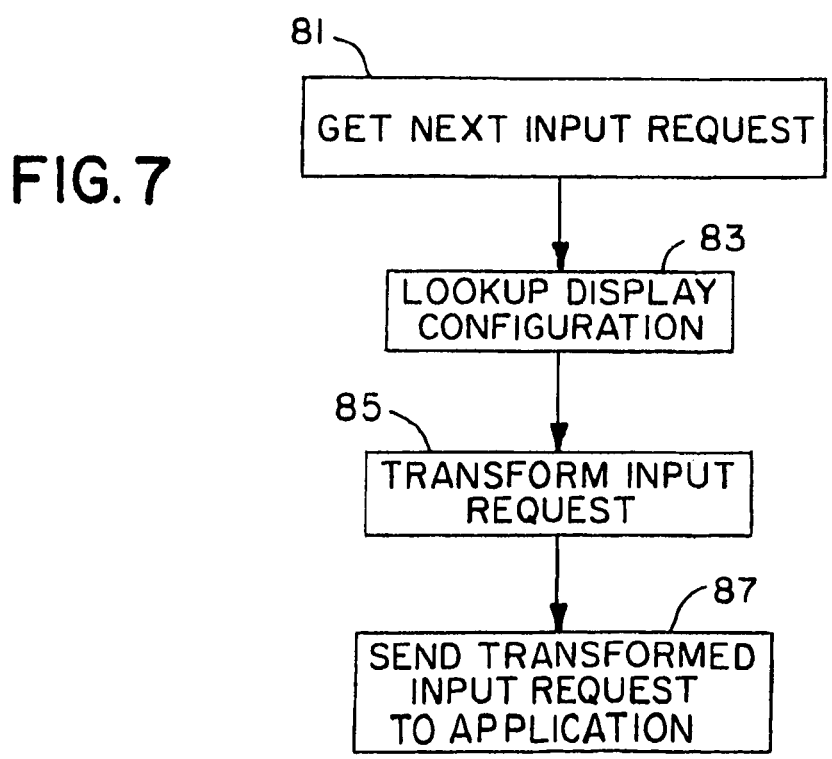
FIG. 7 is the flow diagram of the input direct process flow.

As described in FIG. 7, the Input Redirect process takes input requests 81 and sends the input requests to the appropriate Application.

The Input Redirect processing consists of first, reading the next Input Request 81 from the Operating System. It then looks up the context of the request in the Display Map 83 to determine what transformation is necessary and which Application(s) is(are) to receive the input. After the lookup, the appropriate transformation 85 is applied and the transformed request is sent to the appropriate Application 87. For example, if a mouse device is clicked at X,Y position 100, 250 and the Display Map says that Virtual Display A contains that location, but is scaled down 50%, then display A receives that mouse click at position 200, 500.

As described in FIG. 6, conventional video displays 89 may be manufactured with physical partitions 93 which can separate sub-screens 3 from the main viewing screen 91.

Figure 9:
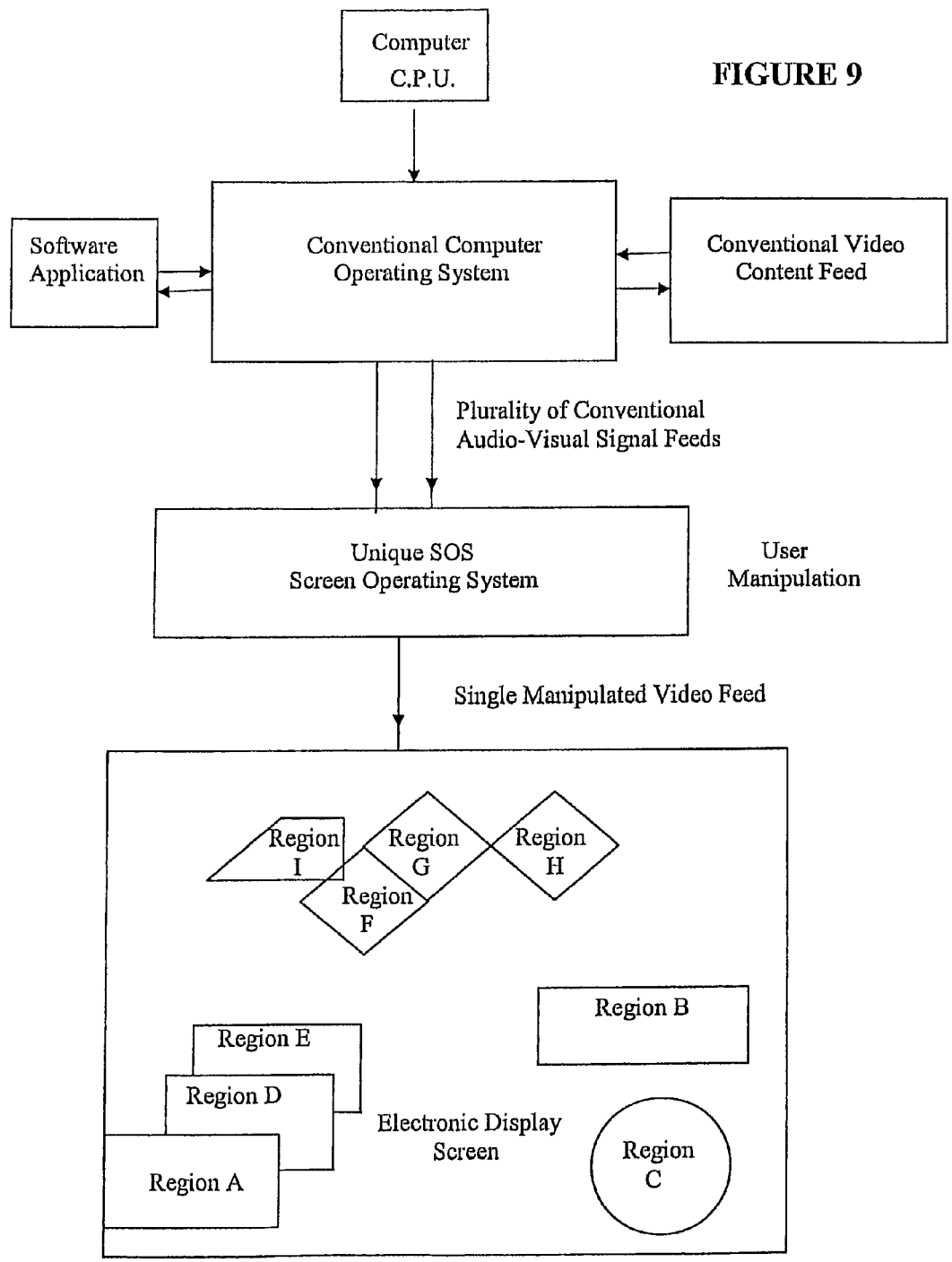

FIG. 9 is a flow chart shows that a computer C.P.U. communicates with the Conventional Computer Operating System, which interacts both with its respective Software Application, as well as Conventional Video Content Feed sent to it. A plurality of Conventional Audio-Visual Signal Feeds are sent from the Conventional Computer Operating System to the Unique Screen Operating System (SOS). Then, the user in the broad sense of the term noted above manipulates the Plurality of Conventional Audio-Visual Signal Feeds into a user-selected Single Manipulated Video Feed, which can have a plurality of user selected data therein. The user manipulated Single Manipulated Video Feed is sent to the user-selected regions of the Electronic Display Screen, where the data can be manipulated in the respective user selected regions, such as Regions A, B and C. Optionally, the discrete, independently operating sub-regions may additionally include layered partially hidden regions D and E, which are shown partially behind region A. These dynamic viewing layers D and E are also user manipulable such that the number and order of layers A, B, C, D and E are user controllable. The user may control and selectively alter layer opacity and may selectively combine elements of the dynamic video display from any layer A, B, C, D and/or E with any portion of any other user selected layer or layers.

FIG. 9 is a flow chart view of the present invention for user manipulation of video feed from a novel screen operating system to screen regions of an electronic display screen of a system having a conventional computer operating system.

FIG. 9 shows screen regions A, B and C are in a side to side or top to bottom relationship with each other in the same plane. However, the user can also manipulate screen regions that overlap each other in three dimensions, such as how screens regions D and E are presented in a front to back three dimensional relationship behind screen region A. In addition the user can manipulate screen regions that physically touch each other, such as screen regions F, G and H, where screen regions F and G touch each other along a common linearly extending edge, or they can tangentially touch each other at a single point, such as how screen regions G and H touch each other tangentially. Moreover, screen regions can intersect each other in a virtual three dimensional space, such as how screen region I intersects screen region F in a plane which intersects the viewing plane of the electronic display screen.

Figure 8:
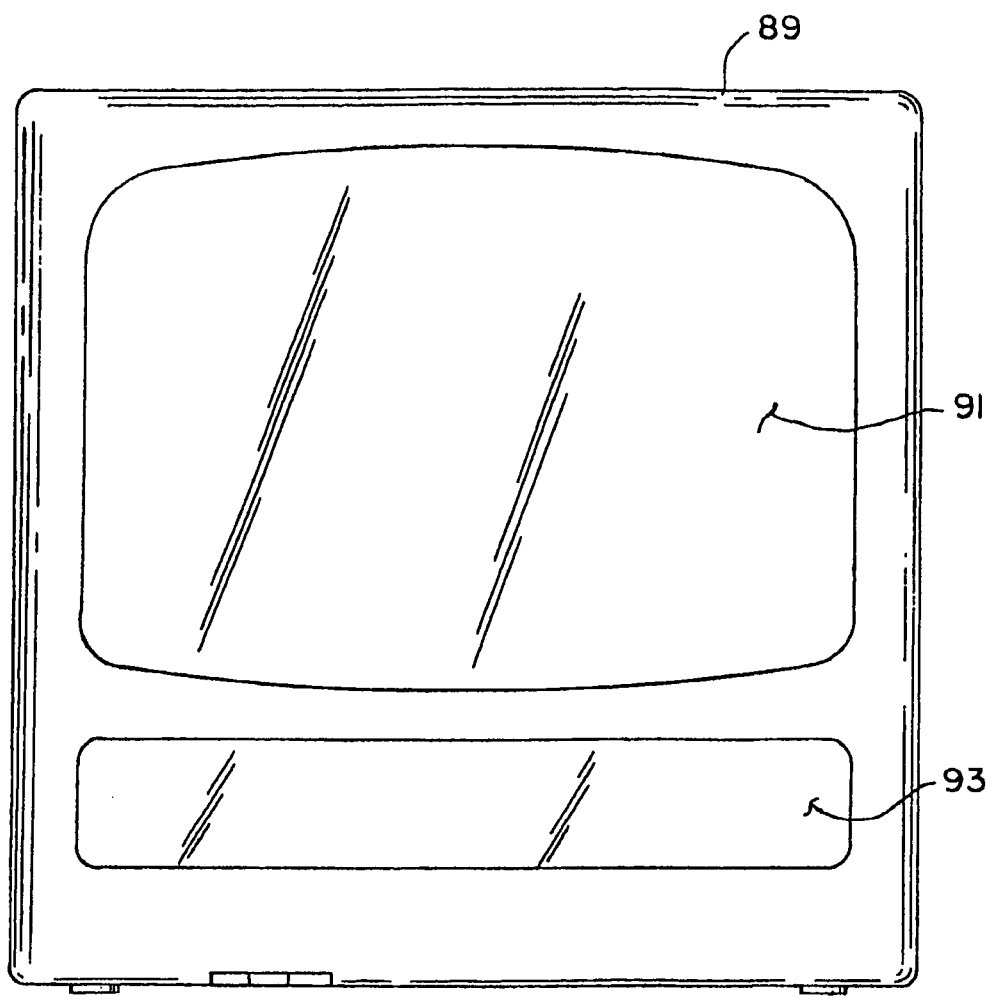
FIG. 8 is a diagrammatic view of a display screen with a partition portion for the sub-screens; and, FIG. 9 is a flow chart view of the present invention for user manipulation of video feed from a novel screen operating system to screen regions of an electronic display screen of a system having a conventional computer operating system

While FIG. 9 depicts a single display with multiple screen regions A through I, data can be also manipulated with other multiple screen regions on one or more other video displays. For example FIG. 3 refers to "Display(s)", meaning one or more video display screens with multiple sub-screen regions therein. For example, the multiple video display screens may be physically separate screens located on a wall or on a display table in an array, such as a video wall of multiple video display monitors 1, 9 or 89 of FIGS. 1, 3 and 8 respectively.

This operating system shown in FIG. 9 is capable of selectively dividing each screen into two or more sub-screens, such as screen regions A through I, which support audio or visual data in an active mode simultaneously and independently. As shown in FIGS. 3-7, this is performed through the use of a plurality of data access lines which provide data simultaneously to the two or more sub-screens such that the data can be simultaneously accessed and manipulated in more than one screen region A through I, or any combination thereof, such that screen region A, B, C, D, E, F, G, H and/or I actively supports data generated from the dedicated software program.

Such invention of FIG. 9 may be implemented in customized encoded hardware, as shown in FIGS. 3-7 and the written description thereof, or a combination of hardware and software, as also shown in FIGS. 3-7 and the written description thereof.

The step forward of this invention lies in the provision of a separate novel screen operating system and in the use of it to provide abstraction and manipulation of conventional data displays from a simultaneous active plurality any conventional source, such as a conventional software program application, and modifying each, any or all of those simultaneous displays so as to show only a user-selected portion thereof, such as the Single Manipulated Video Feed, and further to manipulate the sub-screen or region A, B, C, D or E, in which any one modified conventional data streams has been displayed.

The sub-screen manipulation of the "locational positioning" of modified simultaneous displays by itself is conventional.

But when the simultaneous dynamic modification by manipulation of a plurality of Video Feed data streams is combined into a Single Manipulated Video Feed in connection with the unique Screen Operating System (SOS), with conventional computer desktop management, it is respectfully suggested that novelty has been achieved.

As noted before, the Single Manipulated Video Feed does not require at least two sub-screens. Instead the invention may feature multiple simultaneous video displays (i.e. "regions A, B, C, D and/or E") within a single window of an Electronic Display Screen, meaning that the single window is displaying multiple simultaneous user manipulable active [i.e., dynamic] display regions A, B, C, D and/or E. By using the screen operating system, the user can modify the content of any part of any one or all of the respective displays, even though they are physically manifested on a single screen in what appears to be a single window.

In fact that single window is actually split into a user-controlled number of windows, where each "window" [may be called a sub-screen or screen region] is actually occupying a portion of the display real estate of what otherwise may appear to a viewer as a single window. For example, a dynamically changing weather report could be in a user-controlled upper-right portion (Region B) of the screen; a stock-ticker could occupy a position just below the weather report in the upper-right. A display of a analog clocks could display time-of-day in any user-selected time zone and the clocks could be displayed in a user-controlled upper-left portion of the screen; a conventional TV-broadcast situation comedy could occupy a user controlled lower-left portion of the screen (Region A); a dynamic display of a news broadcast could occupy a position slightly above the situation comedy display; a software application could occupy a user-controlled medial position on the screen, as could a sports-broadcast display and a set of user-selected up-to-the-minute set of sports scores from a user-determined assembly of dynamic sports score data in another region, such as Region C. Additionally, any region, such as, for example, regions D and E may be layered behind any other region, such as region A, B or C.

All of the above display are user-modifiable, movable, enlargeable, and can be selective user-focus-zoomed [focus-zooming is not mere ordinary zooming; focus-zooming is the selection by a user of an arbitration portion of a dynamic video display, and the enlarging [zooming] of only that user-selected portion [as compared with conventional zooming where the entire display is enlarged or reduced as a unit].

With respect to the ordinary definition of the term "manipulate", it is noted as follows:

Computer manipulation, which has been the inventive step forward in the present invention is to be found in the ordinary meaning of the term "computer manipulation" in combination with the text of the specification of this invention as originally filed and the person of ordinary skill in the various arts concerned with this invention will understand the present invention to provide for abstracting, re-configuring, re-displaying in a different user-view a simultaneous dynamic plurality of conventionally-generated Video Feed signals sent to an electronic screen, and not merely conventional desktop management involving subscreen re-sizing, re-positioning, opening, closing, maximizing, minimizing, tiling, cascading, combining, re-combining, and so forth.

This invention also describe screen regions, as well as a plurality of sub-screens.

Screen regions A, B, C, D, E, F, G, H and I comprise portions of a single physical display screen. These screen regions A, B, C, D, E, F, G, H and I comprise portions of a single display screen respectively displaying simultaneous, manipulable, independent, user-selected dynamic video content feeds, fed from the unique screen operating system.

The invention is applicable not merely to a plurality of formally comprised sub-screen Windows upon the display real estate of a single electronic screen, but the sub-screens need not comprise formal windows, but they may be merely "regions" A, B, C, D, E, F, G, H and I of a single display screen in which the respective screen regions are used to display the variety of respective user-selected video contents in the user-selected, user-positioned screen regions. See Also USPTO website, at Patents>Guidance, Tools, and Manuals>Classification>Class Schedule Class 345 Computer Graphics Processing and Selective Visual Display Systems, at 345/115 and foreign classification FOR 138 Simultaneous Diverse Images; see note (1) "Displays with distinct and predisplay regions are included here" id.

As also noted above in the Summary, where a conventional Audio-Visual graphical Signal Feed has been generated, for example, by an internet website coming from a user's financial institution, the user might be interested in his/her bank balance and further interested in ignoring the typical screen-clutter from the bank.

Under the invention the graphical Conventional Audio-Visual Signal Feed would not be fed directly from conventional graphics-generating software that is conventionally found in an on-board graphics card affiliated with the Conventional Computer Operating System. Instead, the graphic signal of the Conventional Audio-Visual Signal Feed for displaying the financial institution website would be fed not to the Electronic Display Screen but rather to the novel screen operating system (SOS) of the invention.

It is the function of the Screen Operating System (SOS) to provide the user with tools to manipulate the through-flowing data stream so as to modify how it is displayed. Under the invention, any desired portion of the Conventional Audio-Visual Signal Feed video display may be user re-sized or hidden in Regions A, B, C, D, E, F, G, H and/or I.

Using the example of the financial institution website, the user could thus modify the Electronic Display Screen displaying the bank balance to show only the displayed "numbers" of the bank balance or to show the bank balance with as much of the surrounding website screen as desired; in addition, the user may selectively re-size the bank balance portion of the feed so as to emphasize it visually in Region A, B or C and then, using one of the plurality of data lines, generate a new discrete bank-balance window as Region A, B, C, D, E, F, G, H and/or I [or sub-screen, to use an alternate term for the same thing].

The new bank-balance window Region A, B, C, D, E, F, G, H and/or I can be positioned, resized, overlaid with other graphics, hidden for user at-will recall and so forth as is done in the above noted prior art patents.

All of the above display regions A, B, C, D, E, F, G, H and/or I are user-modifiable, movable, enlargeable, and can be selectively user-focus-zoomed [focus-zooming is not mere ordinary zooming]; focus-zooming is the selection by a user of an arbitration portion of a dynamic video display, and the enlarging [zooming] of only that user-selected portion [as compared with conventional zooming where the entire display is enlarged or reduced as a unit].

Manipulation of computer graphics accomplishes the above results. It is done by the screen operating system (SOS).

The screen operating system [which may also be called a "unique SOS"] is an auxiliary electronic component. It takes as inputs the Conventional Audio-Video Signal Feed display signals [computer software applications, broadcasts, internet feeds of web pages, web video, etc]. When these Conventional Audio-Video Signal Feed signals from conventional video drivers on conventional operating systems [OSs] such as Windows, Macintosh, Linux, proprietary cell phone or hand-held OSs, are taken into the unique SOS of the present invention, the user is then able to direct, manipulate and control any or all of these inputs with User Manipulation, as also shown in FIG. 1. The Single Manipulated Video Feed output of the unique SOS is what finally gets displayed either in tiles, in discreet sub-screens [where there may be at least two such sub-screens] or in user-manipulable screen regions A, B, C, D, E, F, G. H and/or I as described above.

In contrast to the aforementioned invention, the prior art cited above teaches desktop management, by whatever name it is called. Desktop management in the cited prior art includes "Picture-in-picture" technology, overlaying displayed windows, hiding windows for user on-demand recall, expanding a virtual desktop beyond the size of the available physical screen, moving windows [also called sub-screens] around upon an electronic screen, re-sizing sub-screens, grouping user re-sizable screens into groups of related computer applications so as to create user-invokable and revocable virtual desktops are all provided for in the prior art cited.

However, none of the above noted prior art patents manipulates data streams through a unique Screen Operating System so as to actually produce a Single Manipulated Video Feed and therefore modify the resulting display in Regions A, B, C, D, E, F, G, H and/or I, as the invention does.

None of the above noted prior art modifies data streams using a separate intermediary Screen Operating System (SOS) as does the invention.

None of the above noted cited prior art inventions not only modifies, respectively and individually, a plurality of Conventional Audio-Visual Signal Feed data streams originating from any conventional source into a Single Manipulated Video Feed for display in Regions A, B, C, D, E, F, G, H and/or I in an Electronic Display Screen by selective user control.

Furthermore, none of the above noted prior art patents provides for an add-on Screen Operating System (SOS) to provide a Single Manipulated Video Feed, in addition to the conventional graphics generator to be found in any device having an electronic display screen.

Operation of the System

The invention can also be described as a process for dividing an electronic screen into simultaneously active, discrete, independently operating sub-screens, comprising the steps of:

a) providing an electronic screen;

b) electronically linking the screen to a screen operating system capable of selectively dividing the screen into two or more sub-screens which support visual and/or audio data therein in an active mode simultaneously and independently, one or more of the sub-screens displaying selected TV programming, and others of the sub-screens displaying documents for word processing, graphic images for editing and/or spreadsheets for manipulating data;

c) creating a plurality of data access lines for providing data that can be displayed visually or audibly simultaneously and respectively to the two or more sub-screens;

d) wherein the data stream being displayed in any one of the respective active sub-screens does not override the data stream being displayed in any other respective active sub-screen being simultaneously displayed absent express instruction to do so by a user;

e) simultaneously accessing and manipulating the display of the data in more than one respective sub-screen through the screen operating system, wherein each sub-screen actively supports data generated respectively from a plurality of dedicated software program applications in respective the active sub-screens;

f) and wherein the display of the data generated by the respective software program applications is selectively user-manipulated so as to produce respective user-determined sub-screens in which are displayed user-controlled modifications of the respective software program applications wherein the modifications comprise user-selected portions of the respective conventional displays generated by the respective software program applications; and wherein g) the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens The electronic screen comprises a screen may be selected from the group comprising television screens, electronic screens, computer screens, cellular telephone screens, hand-held device screens, communications device screens, video game screens, digital device display screens and digital display screens.

The invention can best be described as a process for dividing an electronic screen into simultaneously active discrete, independently operating sub-screens, comprising the steps of:

a) providing a television screen;

b) electronically linking the television screen to a screen operating system for selectively dividing the screen into two or more sub-screens which support television programming and non-television visual and/or audio data therein in an active mode simultaneously and independently;

c) creating a plurality of data access lines for providing data that can be displayed visually or audibly simultaneously and respectively to the two or more sub-screens, wherein the access lines are capable of simultaneous conveyance of data to respective active sub-screens;

d) wherein the data stream being displayed in any one of the respective active sub-screens does not override the data stream being displayed in any other respective active sub-screen being simultaneously displayed absent express instruction to do so by a user;

e) selectively enlarging or reducing in size a sub-screen; simultaneously accessing and manipulating the display of the data in more than one sub-screen, wherein each respective sub-screen simultaneously and actively supports a respective data stream generated from among a plurality of dedicated software program applications respectively feeding each of the respective active sub-screens;

g) and wherein the display of the data generated by the respective software program applications is selectively user-manipulated so as to produce respective user-determined sub-screens in which are displayed user-controlled modifications of the respective software program applications wherein the modifications comprise user-selected portions of the respective conventional displays generated by the respective software program applications; and wherein h) the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens The computer system optionally includes a process for dividing an electronic screen into simultaneously active discrete, independently operating sub-screens, comprising the steps of:

a) providing an electronic screen;

b) electronically linking the screen to a screen operating system capable of selectively dividing the screen into two or more sub-screens which support visual and/or audio data therein in an active mode simultaneously and independently, one or more of the sub-screens displaying selected video feeds, and others of the sub-screens displaying documents for word processing, graphic images for editing and/or spreadsheets for manipulating data;

c) creating a plurality of data access lines for providing data that can be displayed visually or audibly simultaneously and respectively to the two or more sub-screens;

d) wherein the data stream being displayed in any one of the respective active sub-screens does not override the data stream being displayed in any other respective active sub-screen being simultaneously displayed absent express instruction to do so by a user;

e) simultaneously accessing and manipulating the display of the data in more than one sub-screen, wherein each respective sub-screen actively supports a respective data stream generated from among a plurality of dedicated software program applications respectively feeding each of the respective active sub-screens; wherein f) the display of the data generated by the respective software program applications is selectively user-manipulated so as to produce respective user-determined sub-screens in which are displayed user-controlled modifications of the respective software program applications wherein the modifications comprise user-selected portions of the respective conventional displays generated by the respective software program applications; and wherein g) the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens The computer system may optionally include an electronic screen selected from the group comprising television screens, electronic screens, computer screens, cellular telephone screens, hand-held device screens, communications device screens, video game screens, digital device display screens and digital display screens.

The computer system can also be optionally described as a process for dividing an electronic screen into simultaneously active discrete, independently operating sub-screens, comprising the steps of:

a) providing a computer display screen;

b) electronically linking the computer display screen to a screen operating system for selectively dividing the screen into two or more sub-screens which support visual and/or audio data therein in an active, mode simultaneously and independently;

c) creating a plurality of data access lines for providing data that can be displayed visually or audibly simultaneously and respectively to the two or more sub-screens, wherein the access lines are capable of simultaneous conveyance of data to respective active sub-screens;

d) wherein the data stream being displayed in any one of the respective active sub-screens does not override the data stream being displayed in any other respective active sub-screen being simultaneously displayed absent express instruction to do so by a user;

e) selectively enlarging or reducing in size a sub-screen;

f) simultaneously accessing and manipulating the display of the data in more than one sub-screen, wherein each respective sub-screen actively supports a respective data stream generated from among a plurality of dedicated software program applications respectively feeding each of the respective active sub-screens; and wherein g) the display of the data generated by the respective software program applications is selectively user-manipulated so as to produce respective user-determined sub-screens in which are displayed user-controlled modifications of the respective software program applications wherein the modifications comprise user-selected portions of the respective conventional displays generated by the respective software program applications; and wherein h) the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens The invention can also be optionally described as a visual management system comprised of computer hardware and software, the hardware comprising at least one computer having screen operating system software; and wherein a) the hardware comprising at least one screen for display of information, the computer and the screen being connected by a plurality of respective data lines, wherein b) the at least one screen being divided into discrete, independently operating sub-screens containing simultaneously active content feeds from respective different dedicated software applications; and wherein c) the respective sub-screen displays do not override the content of the other locations or sub-screens depending on user preference.

The invention can further be described as a computer and screen display apparatus having software therein, the apparatus comprising:

a) a visual management system comprised of computer hardware and software;

b) the hardware comprising at least one computer of suitable capacity having screen operating system software, wherein c) the at least one screen being divided into discrete, independently operating sub-screens containing simultaneously active content feeds from respective different signal feeds, including television programming and dedicated software applications; and wherein d) the respective sub-screen displays do not override the content of the other locations or sub-screens depending on user preference.

The visual management system described also optionally includes optionally the display of the data generated by the respective software program applications being selectively user-manipulated, so as to produce respective user-determined sub-screens in which are displayed user-controlled modifications of the respective software program applications wherein the modifications comprise user-selected portions of the respective conventional displays generated by the respective software program applications. In this option, the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens.

The display of the data generated by the respective software program applications can be selectively user-manipulated so as to produce respective user-determined sub-screens in which are displayed user-controlled modifications of the respective software program applications wherein the modifications comprise user-selected portions of the respective conventional displays generated by the respective software program applications; and wherein the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens.

Moreover, the invention can also be optionally described as a process for dividing an electronic screen into simultaneously active, discrete, independently operating sub-regions, comprising the steps of:

a) providing an electronic screen;

b) electronically linking the screen to a screen operating system capable of selectively dividing the screen into two or more regions on the screen which support visual and/or audio data therein in an active mode simultaneously and independently, the regions displaying user-selected dynamic video content of any kind such as TV programming, documents for word processing, graphic images for editing and/or spreadsheets for manipulating data;

c) creating a plurality of data access lines for providing the data comprising the dynamic video content to the respective screen regions;

d) wherein the data stream of respective user selected video content being displayed in any one of the respective screen regions does not override the data stream of respective user selected video content being displayed in any other respective screen region absent express instruction to do so by a user;

e) simultaneously accessing and manipulating the display of the user selected dynamic video content in any of the respective screen regions through the screen operating system, wherein the screen regions respectively support and dynamically display data generated respectively from a plurality of dynamic video sources including dedicated computer software program applications, multimedia video signals including broadcasts, movies, and CD or DVD content, video display content from hand-held devices, telephones, video games and so forth without limit;

f) wherein the dynamic display of the video content data incoming to the screen operating system from conventional video signal sources is selectively user-manipulated so as to produce respective user-determined screen regions in which are displayed user-controlled modifications of the respective video content data wherein the modifications comprise user-selected portions of the respective conventional video signal sources; and wherein g) the user determined screen regions containing the modifications of the conventional video signal sources are user-controllable according to conventional user desktop management, including conventional opening and closing of the user determined screen regions, conventional resizing of the user determined screen regions, conventional layering, tiling, cascading, maximizing and minimizing of the user determined screen regions.

Furthermore, the invention involves optionally the acts of simultaneously accessing and manipulating the display of the data in more than one sub-screen and wherein the display of the data generated by the respective software program applications is selectively user-manipulated so as to produce respective user-determined sub-screens in which are displayed user-controlled modifications of the respective software program applications wherein the modifications comprise user-selected portions of the respective conventional displays generated by the respective software program applications. In this option the user determined sub-screens containing the modifications of the conventional displays of respective software program applications are user-controllable according to conventional user desktop management, including conventional opening and closing of the user determined sub-screens, conventional resizing of the user determined sub-screens, conventional layering, tiling, cascading, maximizing and minimizing of the user determined sub-screens.

Additionally, the discrete, independently operating sub-regions comprise dynamic viewing layers, wherein said layers are user manipulable such that the number and order of layers is user controllable and wherein the user may control and selectively alter layer opacity. The user may selectively combine elements of the dynamic video display from any layer with any portion of any other user selected layer or layers.

While the above invention has been described with reference to certain embodiments, the scope of the present invention is not limited to these embodiments. One skilled in the art may find variations of these preferred embodiments which, nevertheless, fall within the spirit of the present invention, whose scope is defined by the claims set forth below.

We claim:

1. A method of dividing an electronic screen into a plurality of sub-screen regions and operating each of the sub-screen regions simultaneously, actively and discretely to independently display text, image, video or audio/video content associated with one of a plurality of separate signal feeds, the method operable in a computer processor with a first screen operating system, memory and comprising steps of:

electronically linking the electronic screen to a second screen operating system;

coupling the plurality of separate signal feeds associated with each of the respective sub-screen regions to said screen operating system;

processing each of the plurality of separate signal feeds by the screen operating system to generate a single, composite video feed signal therefrom, the single composite video feed signal comprising the text, image, video or audio/video content associated with each separate signal feed; and using the screen operating system, driving the electronic screen with the composite video feed signal in order to display the text, image, video or audio/video content associated with each of the plurality of separate signal feeds in each of the respective sub-screen regions, wherein the driving includes responding to user input data to discretely and independently access and manipulate the data associated with one or more of the separate signal feeds by arbitrarily managing, controlling, converting, modifying and influencing the data and/or user-focused zooming of user-selected portions thereof, thereby modifying the composite video feed signal and controlling the displayed text, image, video or audio/video content associated therewith in the respective the active sub-screen region in accordance with the manipulation;

which said data is manipulated through discrete access line; wherein the data stream of respective user selected video and/or audio content being displayed in any one of respective predetermined positions of said respective sub-screen regions does not override the data stream of video and/or audio content being displayed in any other respective sub-screen region absent express instruction to do so by a user; amidst simultaneously accessing including editing and extracting to reconfigure user-selected portions of said dynamic video and/or audio display of content in any of said respective portioned sub-screen regions being manipulated through said screen operating system, while said electronic screen remains divided into respective sub-screen regions; interactively selecting a video feed portion of the primary display and displaying just said video feed portion in another display on said display screen; and wherein each said sub-screen region actively supports respective video and/or audio data generated respectively from said video and/or audio display request.

2. The method as set forth in claim 1, wherein the text, image, video or audio/video content displayed in an active sub-screen region is controlled according to conventional user desktop management techniques.

3. The method as set forth in claim 2, wherein said user desktop management techniques include opening and closing, resizing, layering, tiling, cascading, maximizing and minimizing the user-controlled sub-screen regions.

4. The method as set forth in claim 1, wherein said electronic screen is selected from the group comprising television screens, electronic screens, computer screens, cellular telephone screens, hand-held device screens, communications device screens, video game screens, digital device display screens and digital display screens.

5. The method as set forth in claim 1, wherein the step of driving includes that the text, image, video or audio/video content displayed in an active sub-screen region does not override the text, image, video or audio/video content displayed simultaneously in any other active sub-screen region absent express instruction to do so by a user.

6. The method as set forth in claim 1, wherein at least one of the plurality of signal feeds associated with each of the respective sub-screen regions is generated by a dedicated software program application, which is selectively user manipulated.

7. The method as set forth in claim 1, wherein said discrete, independently operating sub-screen regions comprise dynamic viewing layers that are user manipulateable such that a number, order and opacity of the dynamic viewing layers is user controllable.

8. The method as set forth in claim 1, wherein the screen operating system enables a user to selectively combine elements of the dynamic video display from any layer with any portion of any other user selected layer or layers.

9. An electronic display management system, comprising:
a first screen operating system and an electronic display; and
a second screen operating system for controlling and dividing the electronic display into a plurality of sub-screen regions and operating each of the sub-screen regions to simultaneously, actively, discretely and independently control a display of text, image, video or audio/video content associated with one of a plurality of separate signal feeds, the controlling and dividing including:

electronically linking the electronic screen to a screen operating system;

coupling the plurality of separate signal feeds associated with each of the respective sub-screen regions to said screen operating system;

processing each of the plurality of separate signal feeds to generate a single, composite video feed signal therefrom comprising the text, image, video or audio/video content associated with each by said screen operating system; and using the screen operating system, driving the electronic screen with the composite video feed signal in order to display the text, image, video or audio/video content associated with each of the plurality of separate signal feeds in each of the respective sub-screen regions, wherein the driving includes responding to user input data to discretely and independently access and manipulate the data associated with one or more of the separate signal feeds by arbitrarily managing, controlling, converting, modifying and influencing the data and/or user-focused zooming of user-selected portions thereof, thereby modifying the composite video feed signal and controlling the displayed text, image, video or audio/video content associated therewith in the respective the active sub-screen region in accordance with the manipulation;

which said data is manipulated through discrete access lines; wherein the data stream of respective user selected video and/or audio content being displayed in any one of respective predetermined positions of said respective sub-screen regions does not override the data stream of video and/or audio content being displayed in any other respective sub-screen region absent express instruction to do so by a user; amidst simultaneously accessing including editing and extracting to reconfigure user-selected portions of said dynamic video and/or audio display of content in any of said respective portioned sub-screen regions being manipulated through said screen operating system, while said electronic screen remains divided into respective sub-screen regions; interactively selecting a video feed portion of the primary display and displaying just said video feed portion in another display on said display screen; and wherein each said sub-screen region actively supports respective video and/or audio data generated respectively from said video and/or audio display requests.

10. The electronic display management system as set forth in claim 9, wherein said screen operating system controls the text, image, video or audio/video content displayed in an active sub-screen region according to conventional user desktop management techniques.

11. The electronic display management system as set forth in claim 10, wherein said user desktop management techniques include opening and closing, resizing, layering, tiling, cascading, maximizing and minimizing the user-controlled sub-screen regions.

12. The electronic display management system as set forth in claim 9, wherein said electronic screen is selected from the group comprising television screens, electronic screens, computer screens, cellular telephone screens, hand-held device screens, communications device screens, video game screens, digital device display screens and digital display screens.

13. The electronic display management system as set forth in claim 9, wherein screen operating system displays said text, image, video or audio/video content in active sub-screen regions in a way that does not override the text, image, video or audio/video content displayed simultaneously in any other active sub-screen region, absent express instruction to do so by a user.

14. The electronic display management system as set forth in claim 9, wherein at least one of the plurality of signal feeds associated with each of the respective sub-screen regions is generated by a dedicated software program application, which is selectively user manipulated.

15. The electronic display management system as set forth in claim 9, wherein said discrete, independently operating sub-screen regions comprise dynamic viewing layers that are user manipulateable such that a number, order and opacity of the dynamic viewing layers is user controllable.

16. The electronic display management system as set forth in claim 9, wherein the screen operating system enables a user to selectively combine elements of the dynamic video display from any layer with any portion of any other user selected layer or layers.

17. A computer program product in combination with an electronic digital display operable on a processor for the digital display with a first screen operating system, said computer program product including a set of processor readable instructions that when executed by said processor executes a method of dividing an electronic screen into a plurality of sub-screen regions and operating each of the sub-screen regions simultaneously, actively and discretely to independently display text, image, video or audio/video content associated with one of a plurality of separate signal feeds, the method operable in a computer processor with a memory and comprising steps of:

electronically linking the electronic screen to a second screen operating system;

coupling the plurality of separate signal feeds associated with each of the respective sub-screen regions to said screen operating system;

processing each of the plurality of separate signal feeds by the screen operating system to generate a single, composite video feed signal therefrom, the single composite video signal comprising the text, image, video or audio/video content associated with each separate signal feed; and using the screen operating system, driving the electronic screen with the composite video feed signal in order to display the text, image, video or audio/video content associated with each of the plurality of separate signal feeds in each of the respective sub-screen regions, wherein the driving includes responding to user input data to discretely and independently access and manipulate the data associated with one or more of the separate signal feeds by arbitrarily managing, controlling, converting, modifying and influencing the data and/or user-focused zooming of user-selected portions thereof, thereby modifying the composite video feed signal and controlling the displayed text, image, video or audio/video content associated therewith in the respective the active sub-screen region in accordance with the manipulation;

which said data is manipulated through discrete access lines; wherein the data stream of respective user selected video and/or audio content being displayed in any one of respective predetermined positions of said respective sub-screen regions does not override the data stream of video and/or audio content being displayed in any other respective sub-screen region absent express instruction to do so by a user; amidst simultaneously accessing including editing and extracting to reconfigure user-selected portions of said dynamic video and/or audio display of content in any of said respective portioned sub-screen regions being manipulated through said screen operating system, while said electronic screen remains divided into respective sub-screen regions; interactively selecting a video feed portion of the primary display and displaying just said video feed portion in another display on said display screen; and wherein each said sub-screen region actively supports respective video and/or audio data generated respectively from said video and/or audio display requests.

18. A computer system, comprising:
with a first screen operating system and an electronic display; and
a second screen operating system for controlling and dividing the electronic display into a plurality of sub-screen regions and operating each of the sub-screen regions to simultaneously, actively, discretely and independently display text, image, video or audio/video content associated with one of a plurality of signal feeds in accordance with the controlling and dividing, wherein the second screen operating system comprises:
means for automatically electronically linking the electronic screen to said second screen operating system;
means for automatically coupling the plurality of separate signal feeds associated with each of the respective sub-screen regions to said second screen operating system;
means for automatically processing each of the plurality of separate signal feeds by the second screen operating system to generate a single, composite video feed signal therefrom comprising the text, image, video or audio/video content associated with each separate signal feed; and
means for driving the electronic screen with the composite video feed signal in order to display the text, image, video or audio/video content associated with each of the plurality of separate signal feeds in each of the respective sub-screen regions,
wherein the driving includes responding to user input data to discretely and independently access and manipulate the data associated with one or more of the signal feeds by arbitrarily managing, controlling, converting, modifying and influencing the data and/or user-focused zooming of user-selected portions thereof, thereby modifying the composite video feed signal and controlling the displayed text, image, video or audio/video content associated therewith in the respective the active sub-screen region in accordance with the manipulation; which said data is manipulated through discrete access lines; wherein the data streamed of respective user selected video and/or audio content being displayed in any one of respective predetermined positions of said respective sub-screen regions does not override the data stream of video and/or audio content being displayed in any other respective sub-screen region absent express instruction to do so by a user; amidst simultaneously accessing including editing and extracting to reconfigure user-selected portions of said dynamic video and/or audio display of content in any of said respective portioned sub-screen regions being manipulated through said second screen operating system, while said electronic screen remains divided into respective sub-screen regions; interactively selecting a video feed portion of the primary display and displaying just said video feed portion in another display on said display screen; and wherein each said sub-screen region actively supports respective video and/or audio data generated respectively from said video and/or audio display requests.

19. The computer system as set forth in claim 18, wherein said screen operating system controls the text, image, video or audio/video content displayed in an active sub-screen region according to conventional user desktop management techniques.

20. The computer system as set forth in claim 19, wherein said user desktop management techniques include opening and closing, resizing, layering, tiling, cascading, maximizing and minimizing the user-controlled sub-screen regions.

21. The computer system as set forth in claim 18, wherein said second screen operating system displays said text, image, video or audio/video content in active sub-screen regions in a way that does not override the text, image, video or audio/video content displayed simultaneously in any other active sub-screen region, absent express instruction to do so by a user.

22. The computer system as set forth in claim 18, wherein said discrete, independently operating sub-region regions comprise dynamic viewing layers that are user manipulateable such that a number, order and opacity of the dynamic viewing layers is user controllable.

23. The computer system as set forth in claim 18, wherein the second screen operating system enables a user to selectively combine elements of the dynamic video display from any layer with any portion of any other user selected layer or layers.

24. The computer system as set forth in claim 18, wherein the second screen operating system includes a meta video driver capable of accepting electronic dynamic video and/or audio display requests from said respective software applications.

25. The computer system as set forth in claim 18, wherein the second screen operating system includes an information bar, the parameters for which are determinable by user input, which allows a user to modify and control real time changes to all applications providing the signal feeds.

26. The computer system as set forth in claim 25, wherein the information bar provides a scrolling effect to allow viewing of multiple applications in a relatively small portion of the output device.

27. The computer system as set forth in claim 18, wherein said second screen operating system is encoded onto a graphics card.

* * * * *

UNITED STATES PATENT AND TRADEMARK OFFICE
CERTIFICATE OF CORRECTION

| | |
|---|---|
| PATENT NO. | : 9,009,595 B2 |
| APPLICATION NO. | : 12/927711 |
| DATED | : April 14, 2015 |
| INVENTOR(S) | : Joseph P. Catanese and Paul Delano |

It is certified that error appears in the above-identified patent and that said Letters Patent is hereby corrected as shown below:

In the Drawings

In FIG. 3, the spelling of the words "DISLAY CONTENT" should be corrected to read --DISPLAY CONTENT--.

In the Specification

In column 8, line 9, the words "the Video Display(s) component 9" should be corrected to read --the Video Displays(s) component 9 with Display Content 11--.

Signed and Sealed this
Fifth Day of April, 2016

Michelle K. Lee
*Director of the United States Patent and Trademark Office*